(12) United States Patent
Oliver

(10) Patent No.: US 8,146,976 B2
(45) Date of Patent: Apr. 3, 2012

(54) SLIDE-OUT TRAY SYSTEM FOR VEHICLES

(75) Inventor: Jason Oliver, Pike Road, AL (US)

(73) Assignees: Hyundai Motor Company, Seoul (KR);
Kia Motors Corporation, Seoul (KR);
Hyundai America Technical Center, Inc., Superior Township, MI (US)

(*) Notice: Subject to any disclaimer, the term of this patent is extended or adjusted under 35 U.S.C. 154(b) by 250 days.

(21) Appl. No.: 12/512,059

(22) Filed: Jul. 30, 2009

(65) Prior Publication Data

US 2011/0025086 A1 Feb. 3, 2011

(51) Int. Cl.
*B60R 5/00* (2006.01)
(52) U.S. Cl. .................. 296/37.1; 296/76; 414/462
(58) Field of Classification Search ............. 296/37.1, 296/37.6, 26.08, 76, 37.14, 37.08; 414/462; B60R 5/00
See application file for complete search history.

(56) References Cited

U.S. PATENT DOCUMENTS

| | | | | |
|---|---|---|---|---|
| 2,094,401 | A * | 9/1937 | Girl | 414/462 |
| 2,391,310 | A * | 12/1945 | Heller | 414/462 |
| 2,552,898 | A * | 5/1951 | Lenci et al. | 296/37.1 |
| 2,778,517 | A * | 1/1957 | Weinstein et al. | 414/462 |
| 2,953,287 | A * | 9/1960 | Werner | 224/496 |
| 3,381,835 | A * | 5/1968 | Lee | 414/462 |
| 3,627,158 | A * | 12/1971 | Kobasic | 414/462 |
| 4,799,849 | A * | 1/1989 | Miller | 414/462 |
| 6,273,487 | B1 * | 8/2001 | Schurig et al. | 296/37.14 |
| 6,422,567 | B1 * | 7/2002 | Mastrangelo et al. | 296/37.1 |
| 6,814,384 | B2 | 11/2004 | Grafton | |
| 7,240,942 | B2 | 7/2007 | Grafton | |

* cited by examiner

*Primary Examiner* — Glenn Dayoan
*Assistant Examiner* — Pinel Romain
(74) *Attorney, Agent, or Firm* — Edwards Wildman Palmer LLP; Peter F. Corless

(57) ABSTRACT

Slide-out tray systems for a vehicle comprise: a pair of tracks provided inside the trunk of the vehicle in a vehicle length direction; a tray mounted on the tracks; a bar pivotally connected to a connector part connecting the trunk lid to a vehicle body panel; and a cable connected to the tray and the bar and having a length such that when the trunk lid is open, the tray can be pulled out of the trunk in a rearward direction without interference by tension applied to the cable. With the systems, inconveniences associated with loading and unloading items can be eliminated or reduced.

16 Claims, 16 Drawing Sheets

A

B

SLIDE-OUT TRAY SYSTEM FOR VEHICLES

BACKGROUND (a) Technical Field

The present disclosure relates to a slide-out tray system for a vehicle.

(b) Background Art

A conventional vehicle includes a trunk having a space for storing items. Typically, the trunk includes a trunk lid, a connector part for connecting the trunk lid to a vehicle body panel directly or indirectly (e.g., through an intermediate panel), and a latch for engaging and disengaging the trunk lid into and from a vehicle body portion.

The trunk lid is opened and/or closed manually and/or automatically. For example, a trunk lid switch or handle is provided inside the vehicle to open and close the trunk lid so that driver does not need to get out of the vehicle to open and close the trunk lid or it does not need someone else's help to open and close the trunk lid.

In the conventional vehicle, however, inconveniences still exist. That is, vehicle driver or others have difficulty in loading and uploading items to and from the trunk.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a slide-out tray system for a vehicle which includes a trunk lid, a latch attached to a rear portion of the trunk lid, and a connector part for connecting the trunk lid to a portion of a body panel of the vehicle so as to be able to open and close the trunk lid manually or automatically. The system includes a pair of tracks, a tray, a bar and a cable. The tracks are mounted, in a vehicle length direction, to a vehicle underbody panel near a space provided for installing a spare tire. The tray is mounted on the tracks. The bar (30) is pivotally connected to the connector part so that the bar can move in one direction (e.g., forward or backward) when the trunk lid becomes closed and can move in another direction (e.g., backward or backward) when the trunk lid becomes opened. The cable is connected to both the tray and the bar and has a length such that when the trunk lid is open, the tray mounted to the track(s) can be pulled out of the trunk in a rearward direction without interference by tension applied to the cable.

In an embodiment, each of the tracks includes a first part and a second part positioned below the first part and connected to the first part so as to move together. In this embodiment, the tray may be mounted on top of the first part and the second part may be mounted on the vehicle underbody panel near a space provided for installing a spare tire.

In another embodiment, each of the tracks includes a first part and a second part positioned in parallel with the first part and connected to the first part so as to move together. In this embodiment, the tray may be mounted on top of the first part, the second part, or both. The first part, second part, or both may be mounted on the vehicle underbody panel near a space provided for installing a spare tire.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed in detail infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
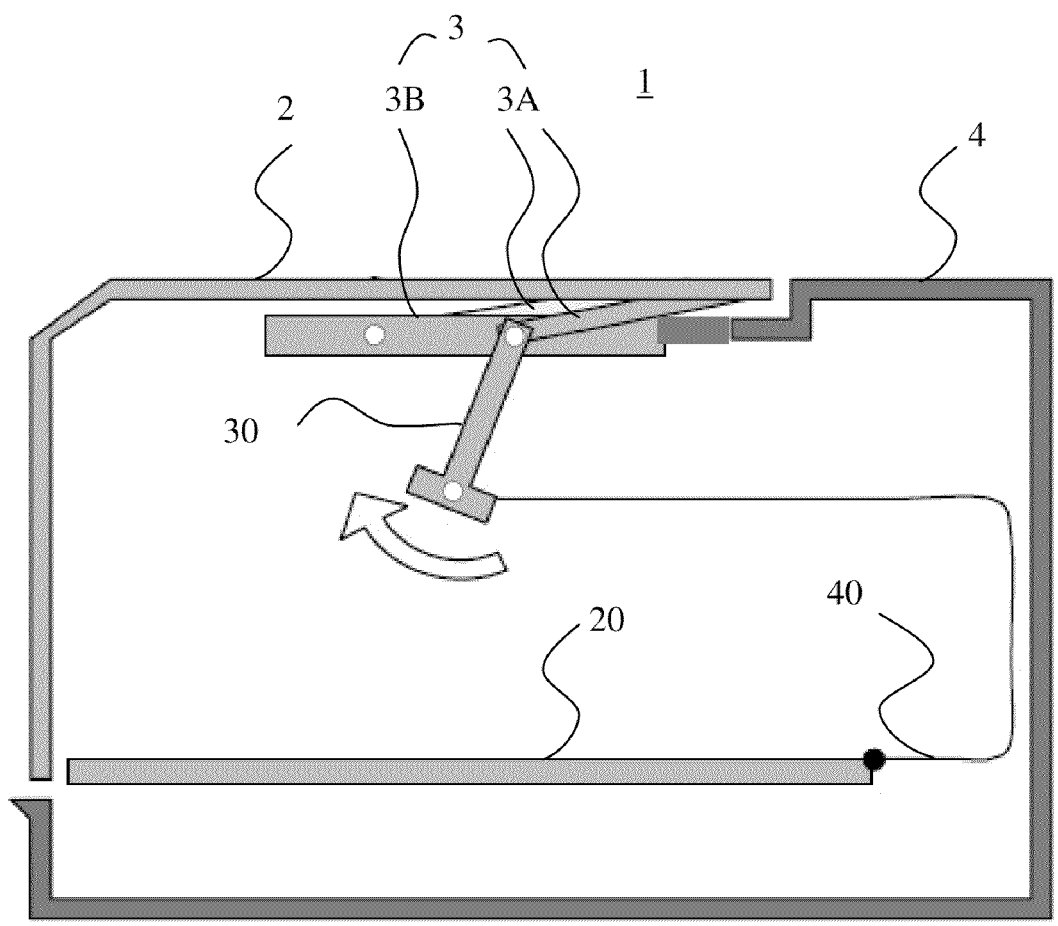
FIG. 1 is a schematic view of a rear portion of a vehicle having a slide-out tray system according to an embodiment of the present invention, in which the trunk is closed.

FIG. 1 schematically shows a rear portion of a vehicle to which a slide-out tray system (1) according to an embodiment of the present invention is applied.

The slide-out tray system (1) can be applied to a trunk of various types of vehicles which includes a trunk lid (2), a latch (not shown) attached to a rear portion of the trunk lid (2), and a connector part (3) connecting the trunk lid (2) to a portion of a body panel (4) of the vehicle so that the trunk lid (2) can be opened and closed.

The connector part (3), as known in the art, may be formed in various ways. As an example of the connector part (3), an arm (3A) (or panel) or arms (or panels) that are arranged in series or parallel to connect a trunk lid to a vehicle body panel can be used. The shape and kind of the arms (or panels) are not limited to specific ones. Preferably, the arm (or panel) or arms (or panels) (3A) can be attached to a portion of a vehicle body panel through a bracket (3B) that is attached to a portion of a vehicle body panel (4) for supporting the arm(s) or panel(s). As the various structures of the connector part (3) and operation mechanism thereof are known in the art, further detailed description is omitted.

The opening and/or closing of the trunk lid, as known in the art, can be performed manually or automatically, detailed description of which is omitted.

Figure 7:
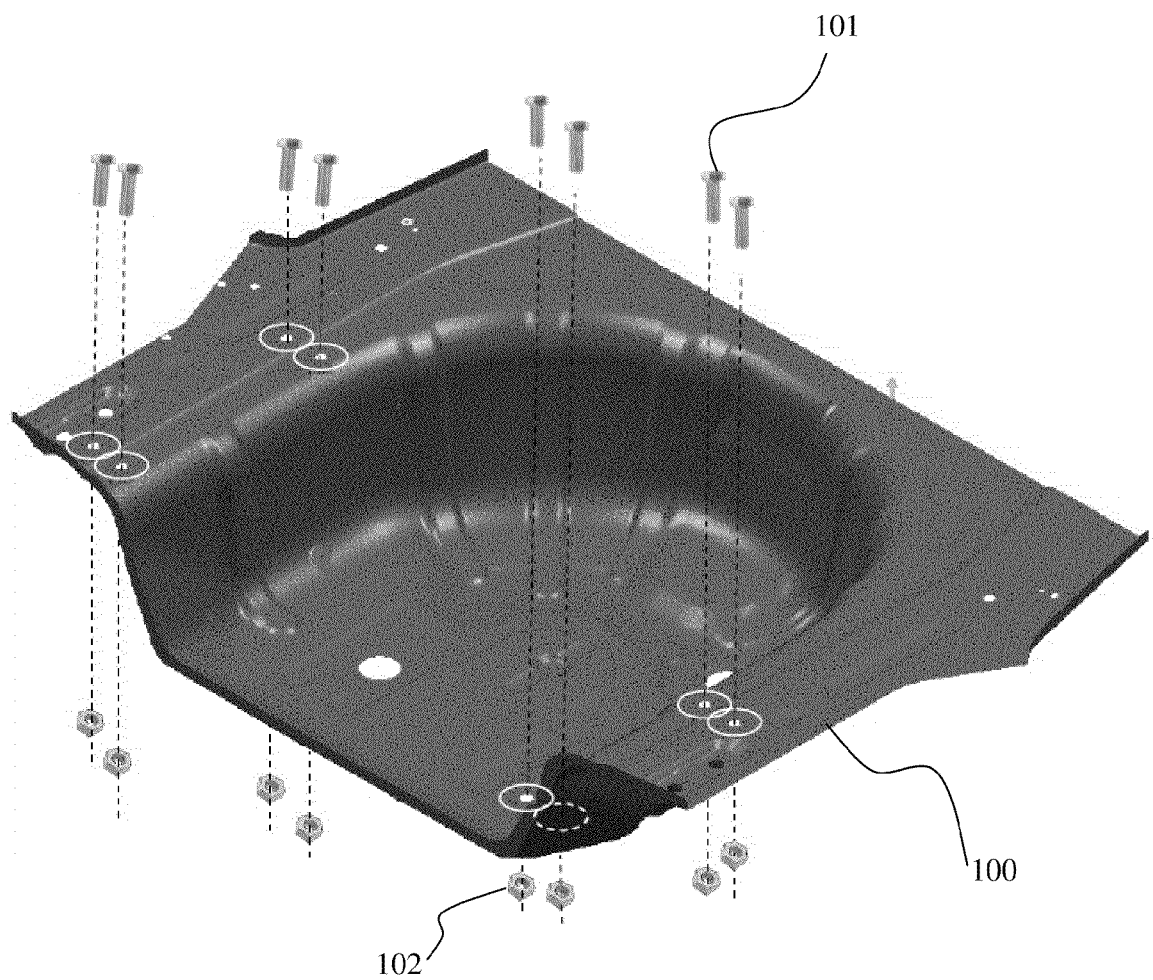
FIG. 7 is a schematic view illustrating the attachment of the bearing bracket to a trunk trim board and a underbody panel of a vehicle.

The slide-out tray system (1) may include a pair of tracks (10), a tray (20), a bar (30), and a cable (40). The tracks (10) may be mounted, in a vehicle length direction, on/to a vehicle underbody panel (100) near a space (101) provided for installing a spare tire (102) (see FIGS. 7 and 8). The number of tracks is not limited thereto. For example, one track may be connected to the vehicle underbody panel (100) at the right side of the space (101) and another track may be connected to the vehicle underbody panel (100) at the left side of the space (101), as shown in FIG. 7. Also, for example, although not shown in the drawings, two or more tracks may be connected to the vehicle underbody panel (100) at the right side of the space (101) and two or more tracks may be connected to the vehicle underbody panel (100) at the left side of the space (101).

Figure 4A:
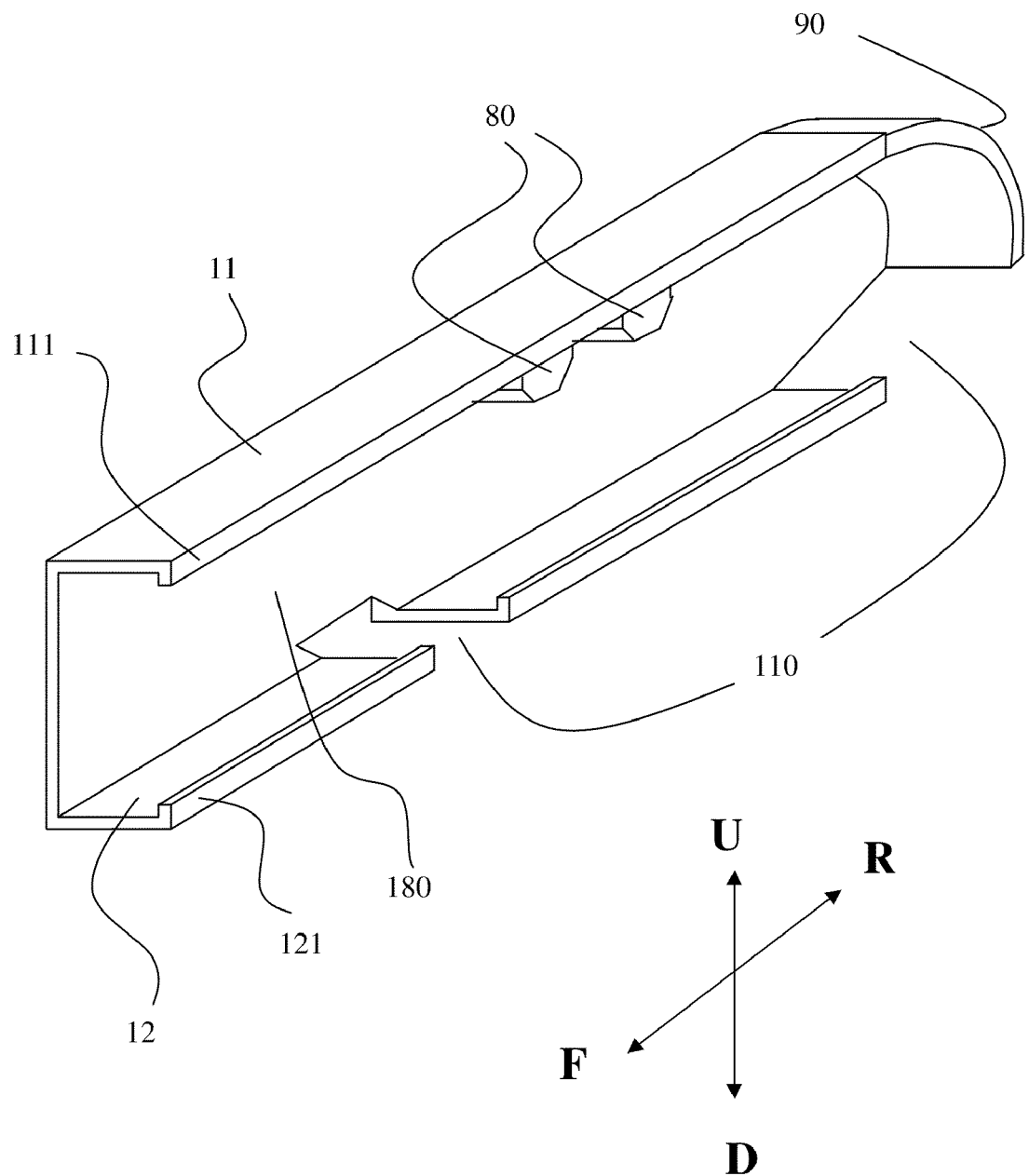
FIG. 4A is a perspective schematic view illustrating the relative position of the first part and second parts of a track of a slide-out tray system according to an embodiment of the present invention, in which "F," "R," "U," and "D" refer to forward, rearward, upward, and downward direction with regard to the vehicle, respectively.

Preferably, each of the tracks (10) may include a first part (11) and a second part (12). In an embodiment, the first part (11) may be positioned above the second part (12), as shown in FIG. 4A. The first part (11) and the second part (12) are connected so that they can move together. That is, the first and second parts (11, 12) can be connected in various ways, e.g., continuously or discontinuously and detachably or permanently. For example, as shown in FIG. 4A, the first part (11) may be continuously and permanently connected to the second part (12) by an intermediate part (180) that is integrally formed with the first and second parts (11, 12) for connecting one end of the first part (11) and one end of the second part (12). Alternatively, the intermediate part (180) may be provided as a distinct structure that can be detachably connected to the first and second parts (11, 12). Also, for example, although not shown in the drawings, the first and second parts (11, 12) can be connected discontinuously; i.e., only one or more portions of the first part (11) and the second part (12) can be connected permanently or detachably.

Preferably, the tray (20) is mounted on some of the tracks (10). More preferably, it is mounted on all of the tracks. In a slide-out tray system having a pair of tracks, as shown in FIG. 7, the tray (20) may be mounted on top of the first part (11) of the two tracks. In this case, the second part (12) may be mounted on the vehicle underbody panel (100) near a space (101) provided for installing a spare tire (102). Depending on design requirement or preference, the tray (2) can be permanently or detachably mounted on top of the first part (11). Likewise, the second part (12) can be permanently or detachably mounted on the vehicle underbody panel (100).

The bar (30) is pivotally connected to the connector part (3). Due to the pivotal connection, the bar (30) can move in one (e.g., forward or rearward) direction when the trunk lid (2) becomes closed and can move in another (e.g., rearward or forward) direction when the trunk lid (2) becomes opened.

More particularly, for instance, in the state where the trunk lid (2) is closed, the bar (30) is pivotally moved in a rearward direction as represented by the arrow of FIG. 1, which causes tension to be applied to the cable. Due to the tension, the tray (20) is moved in a forward direction so that it is accommodated within the trunk.

Figure 2:
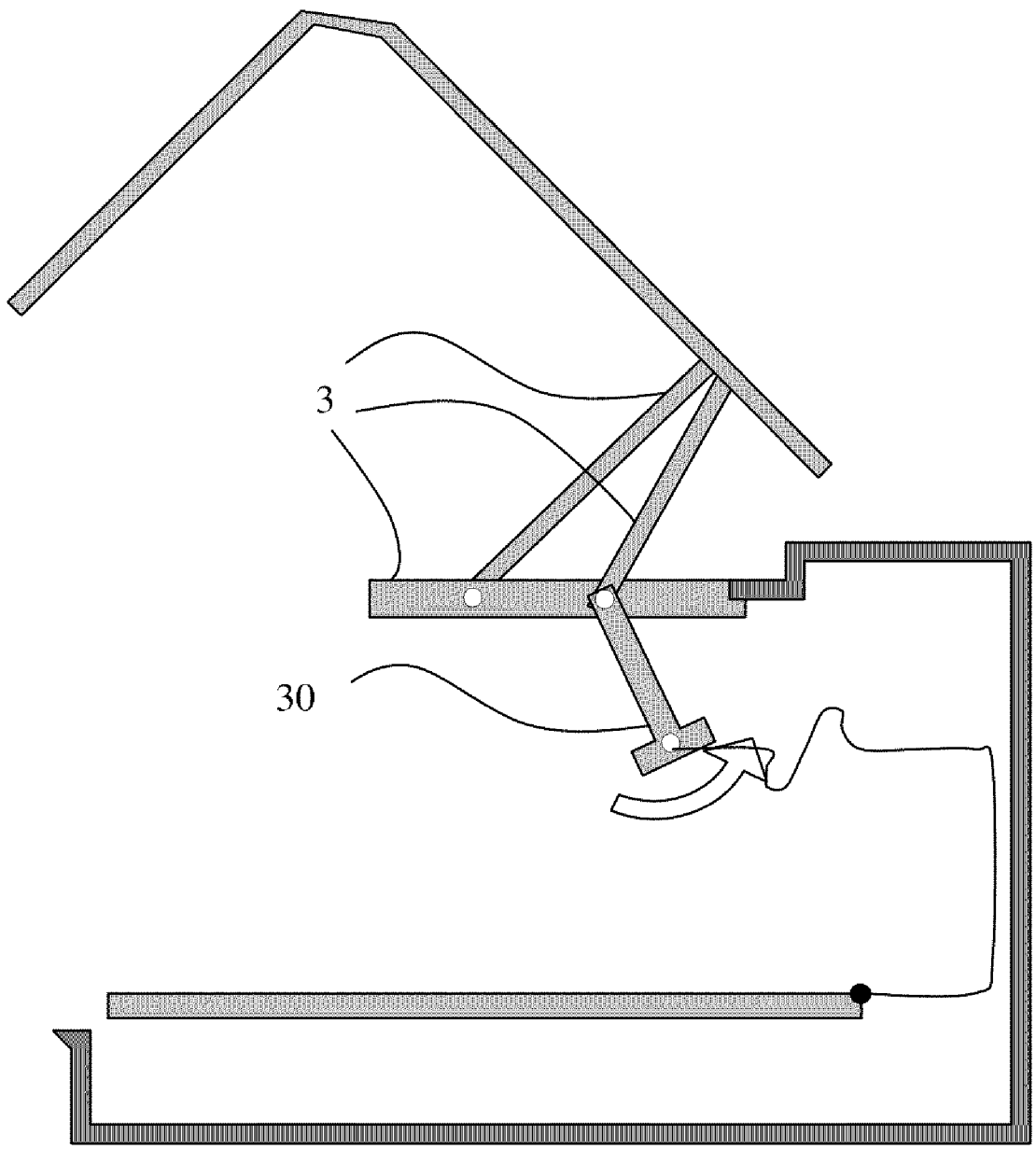
FIG. 2 is a schematic view of a rear portion of a vehicle having a slide-out tray system according to an embodiment of the present invention, in which the trunk is open.
Figure 3:
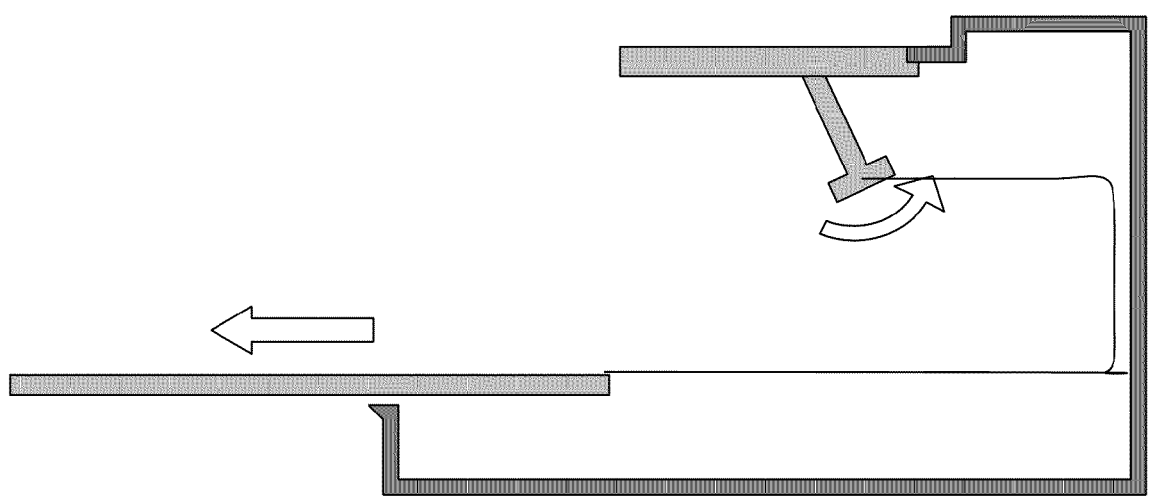
FIG. 3 is a schematic view of a rear portion of a vehicle having a slide-out tray system according to an embodiment of the present invention, in which the trunk is open and the tray is pulled out of the trunk.

On the other hand, if the trunk lid (2) becomes opened, the bar (30) is pivotally moved in a forward direction as represented by the arrow of FIG. 2, which causes the tension on the cable to be released. As a result, at least a portion of the tray (20) can be pulled out of the trunk without interference by such tension, as shown in FIG. 3.

The cable (40) is connected to both at least a portion of the bar (30) and at least a portion of the tray (20). The connection position and the number of the cable (40) is not limited to particular ones as long as the cable (40) enables the tray (20) to be pulled out of the trunk in a rearward direction without interference by tension applied to the cable (40) in a state where the trunk lid (2) is open. Preferably, the cable (40) may be connected to a rear portion of the tray (20). Also preferably, it may be connected to a portion of the tracks (10) to be connected to the tray (20). The cable (40) may be permanently or detachably connected.

Figure 6:
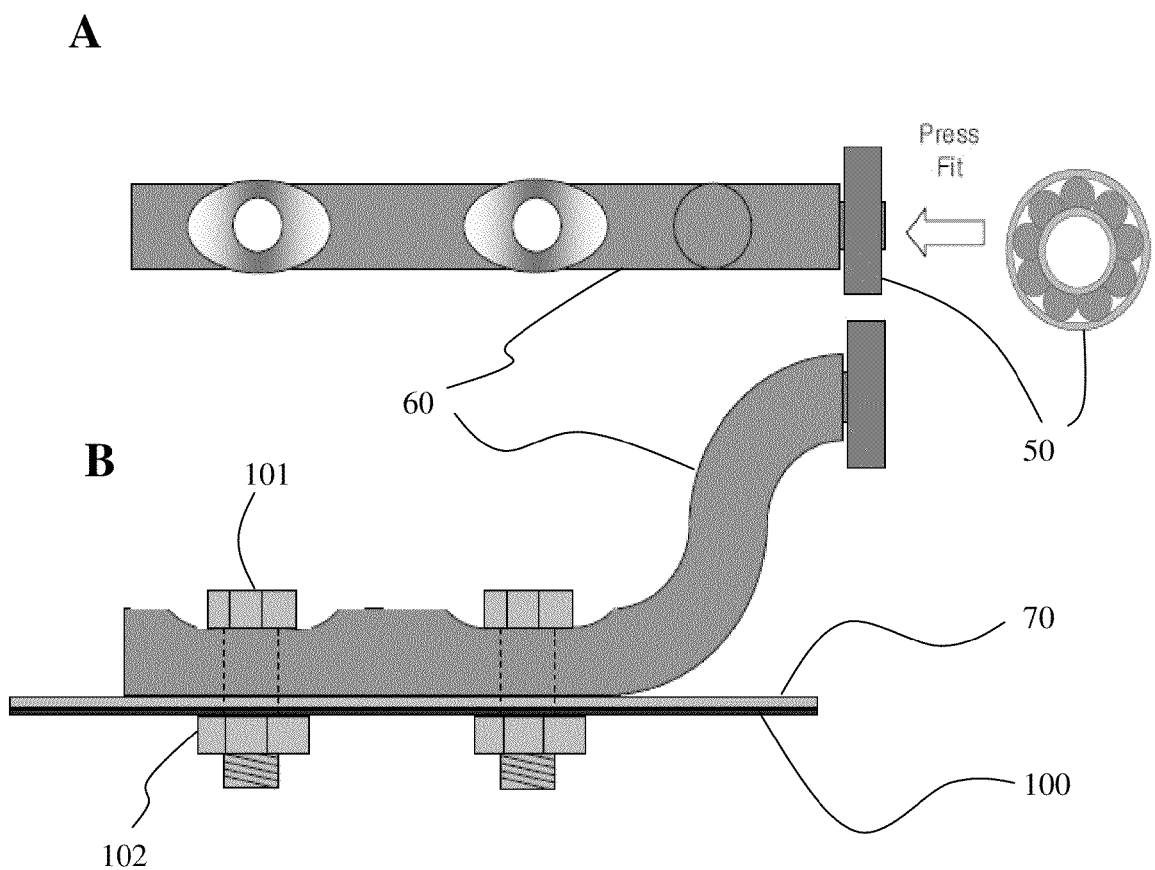
FIGS. 6A and 6B are a top view and a side view, respectively, of a bearing and a bearing bracket of a slide-out tray system according to an embodiment of the present invention.

Preferably, at least one of the second parts (12) may be mounted on/to the vehicle underbody panel (100) near a space (101) provided for installing a spare tire (102) by a plurality of brackets (60). Each of the brackets supports a plurality of bearings (50). The bearings supported in the bracket(s) are placed between the first part (11) and the second part (12) such that the first and second parts (11, 12) can be slidably moved by rotation of the bearing(s) therebetween (See FIGS. 6-8).

Figure 8:
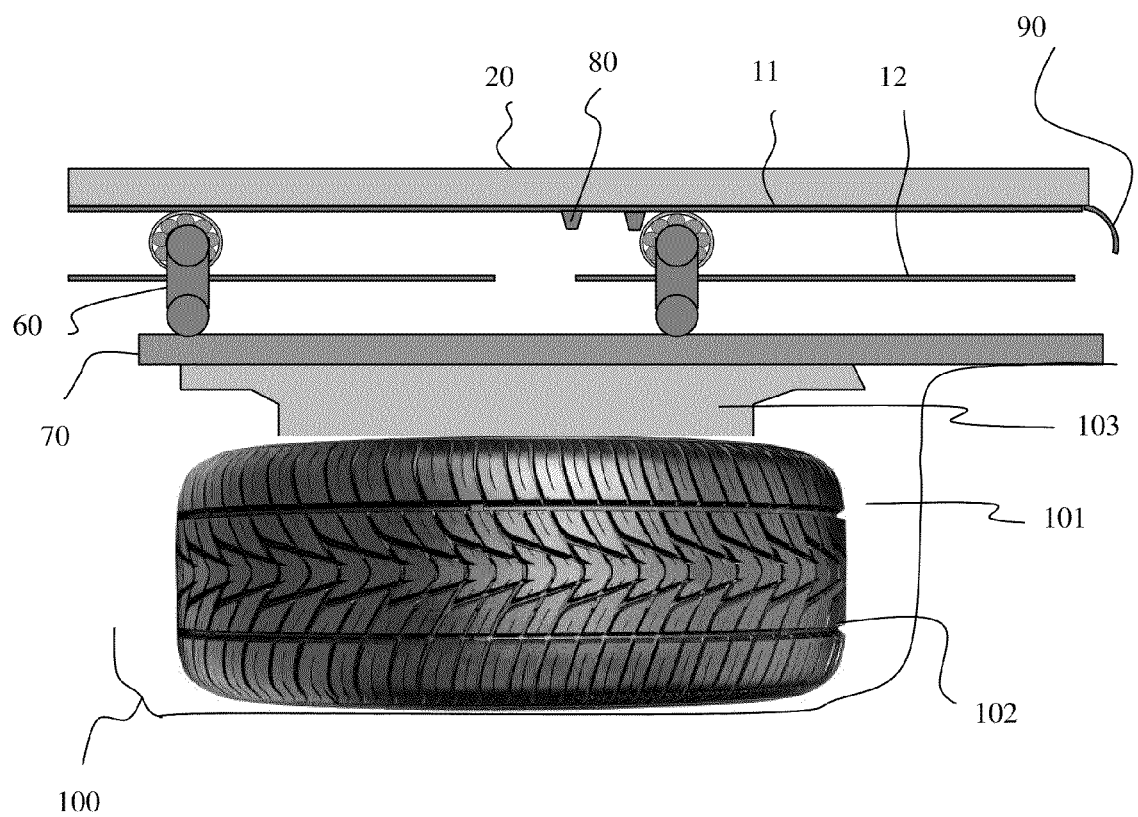
FIG. 8 is a schematic view illustrating a slide-out tray system according to an embodiment of the present invention.
Figure 9:
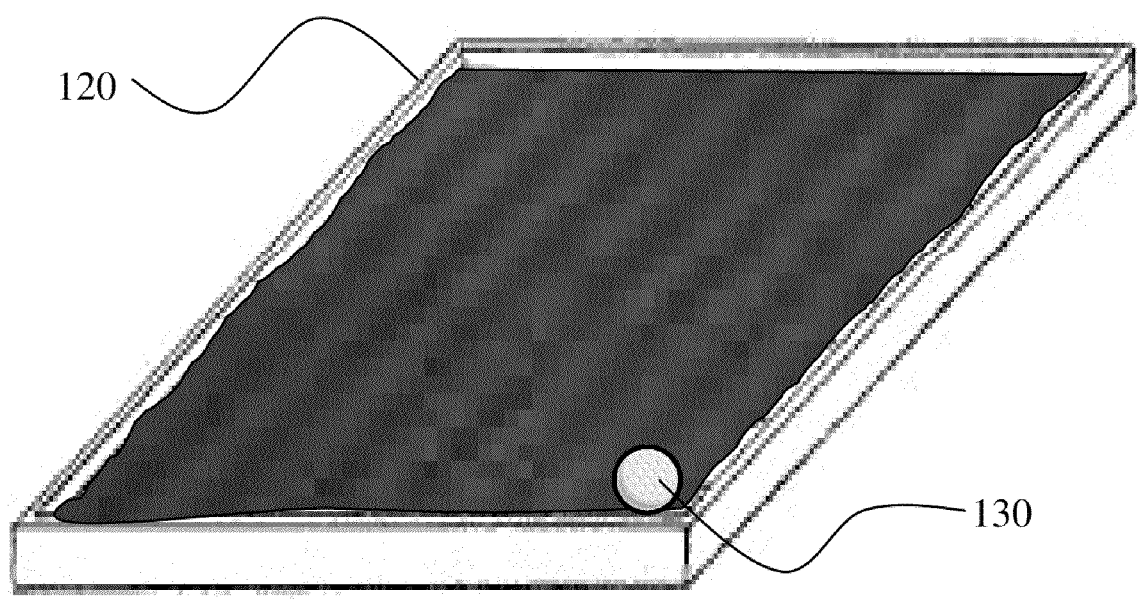
FIG. 9 is a schematic view showing an example of the tray of a slide-out tray system according to an embodiment of the present invention.

The number of the bearings (50) can vary depending on design requirement or preference. For example, two bearings can be provided between the first part (11) and the second part (12) at the right side with regard to the space (101) for installing a spare tire (102) and two other bearings can be provided between the first rail of the first part (11) and the second rail of the second part (12) at the left side with regard to the space (101), as shown in FIGS. 7 and 8.

Preferably, the bearings (50) can be press fitted into the brackets (60). Also, one ore more of the brackets (60) can be permanently or detachably connected to the vehicle underbody panel (100) by using, e.g., welding or bolt/nut. For instance, a weld nut (102) may be applied to a portion of the vehicle underbody panel (100) and a bolt may be used to connect the bracket to the vehicle underbody panel (100). The bracket (60) may have one or more holes through which a bolt or bolts can be inserted to support the bearing or bearings (50). Suitably, a trunk trim board (70) may be interposed between the bracket (60) and the vehicle underbody panel (100).

Figure 4B:
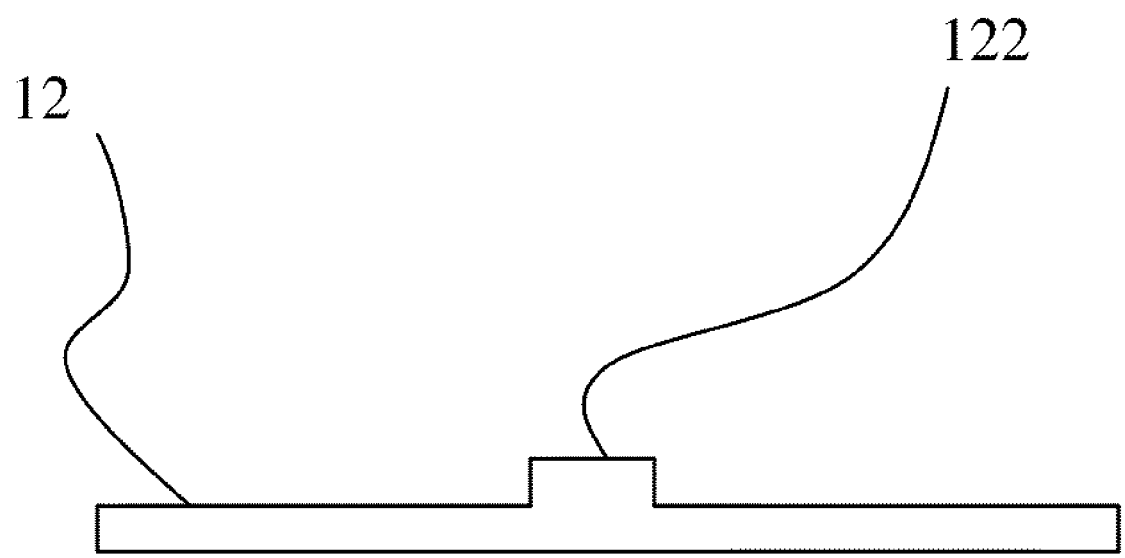
FIG. 4B is a cross-sectional view illustrating a modified example of the first and second parts.

As long as the bearing (50) can rotate along and between the first and second parts (11, 12), the shape and size of the bearing (50), the first part (11), and the second part (12) are not limited to specific ones. For example, as shown in FIG. 4A, the first part (11) has a bending portion (111) at an end thereof and the second part (12) has a bending portion (121) at an end thereof. The bending portions (111, 121) and the intermediate part (180) form a groove in which the bearing(s) (50) can be rotated. Also, for example, as shown in FIG. 4B, the second part (12) includes a protruding portion (122) in a middle portion thereof. The bearing (50) includes a groove (not shown) in a circumferential end thereof such that the protruding portion (122) fits the groove. The bearing (50) thus can rotate along the protruding portion (122) between the first part (11) and the second part (12). In a modified embodiment, although not shown in FIG. 4B, the first part (11) as well as the second part (12) may include a corresponding protruding portion (not shown) and the protruding portions of the first and second parts (11, 12) fit the groove of the bearing, which facilitates the rotation of the bearing between the first and second parts (11, 12).

Figure 4C:
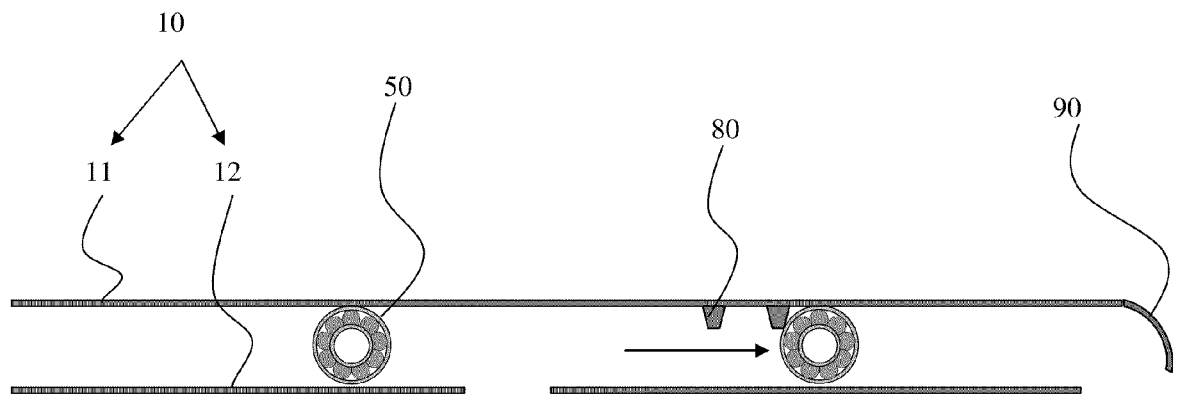
FIGS. 4C and 4D are schematic views illustrating the change of positions of the track relative to the bearings of the slide-out tray system.
Figure 4D:
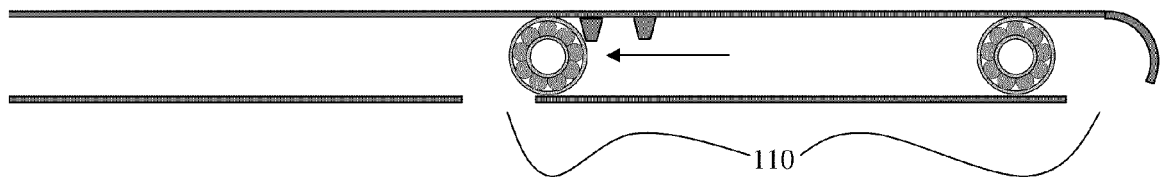

Preferably, at least one protrusion (80) may be attached to the first part (11) at one or more predetermined positions for limit sliding of the track through the rotation of the bearings within a predetermined distance, as shown in FIGS. 4A, 4C, and 4D.

Also preferably, a stopper (90) may be attached to the front end portion of the first part (11) for limit sliding of the track through the rotation of the bearings within a predetermined distance, as shown in FIGS. 4A, 4C, and 4D.

Suitably, the protrusion (80), the stopper (90), or both may be formed integrally with the first part (11).

The second part (12) may include therein one or more openings (110), as shown in as shown in FIGS. 4A, 4C, and 4D. The tray (20) mounted to the first part (11) can be removed from the trunk by divorcing the bearings (50) from the track through the opening(s) (110).

Figure 5A:
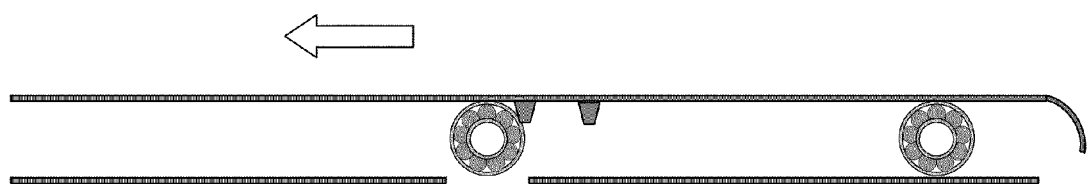
FIGS. 5A to 5E are schematic views illustrating a process of removing out of the trunk the tray of a slide-out tray system according to an embodiment of the present invention.
Figure 5B:
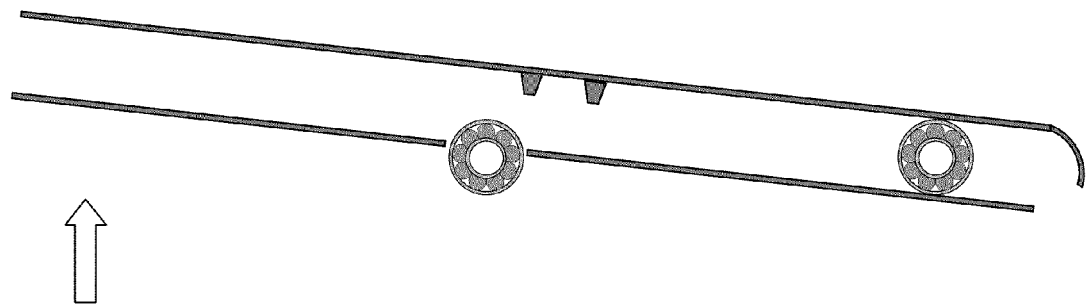
Figure 5C:
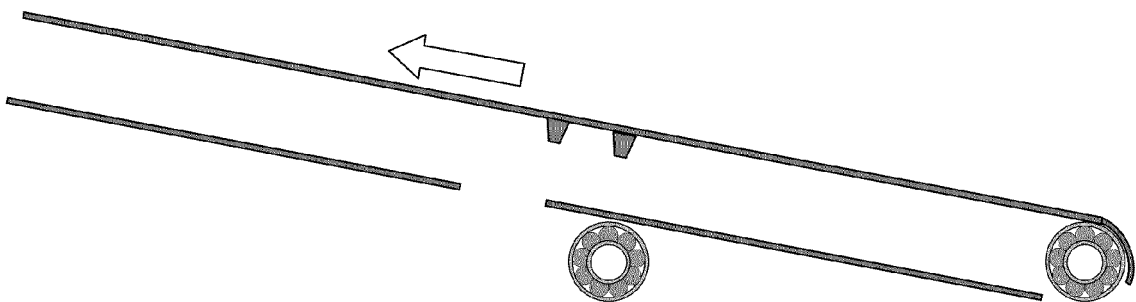
Figure 5D:
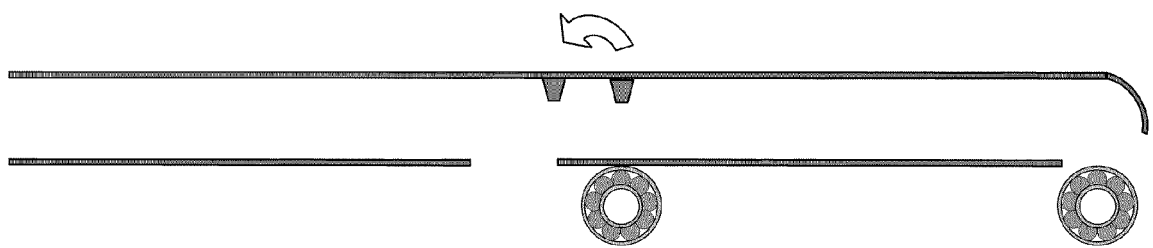
Figure 5E:
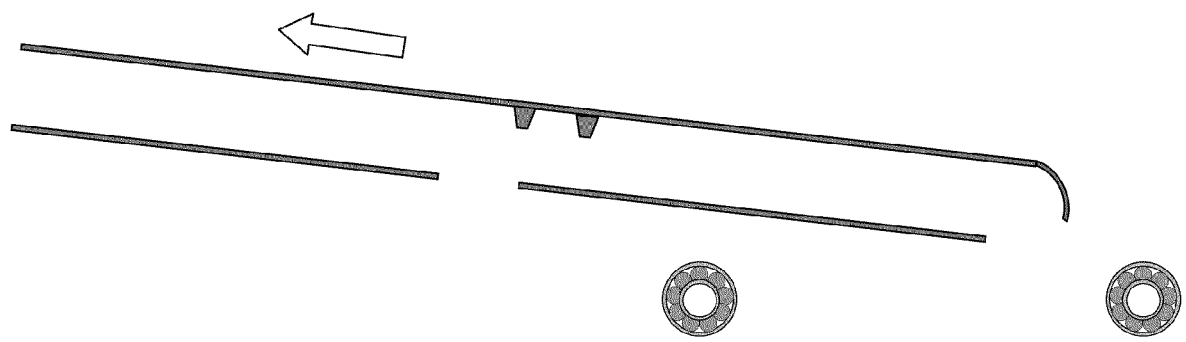

Referring to FIGS. 5A to 5E, a process of removing the tray out of the trunk of a vehicle is described. The track (10) on top of which the tray (20) is mounted is pulled in a rearward direction as represented by the arrow shown in FIG. 5A until the bearing (50) is juxtaposed on the opening (110) in the middle portion of the track. When the bearing is juxtaposed on the opening (110), the track is lifted up in an upward direction as represented by the arrow shown in FIG. 5B such that the bearing can be divorced out of the second part (12). The track is then further pulled in a rearward direction as represented by the arrow shown in FIG. 5C until the other bearing (50) is stopped by the stopper (90). Thereafter, the rear portion of the track is rotated in a downward direction as represented by the arrow shown in FIG. 5D until the bearing is divorced from the opening under the stopper. After the track is divorced from the bearing, the track is removed from the trunk, as shown in FIG. 5E.

The shape of the tray (20) is not limited to a specific one. For example, the tray (20) may have a rectangular or circular shape. It may be designed so as to have its center portion vertically lower than the edge portions. Preferably, its edge portions (120) may be designed to be heightened so as to prevent items such as a golf ball (130) from escaping from the tray. Suitably, a handle (not shown) may be attached to the tray (20) such that a user can grab the handle in pulling or pushing the tray (20).

Figure 10:
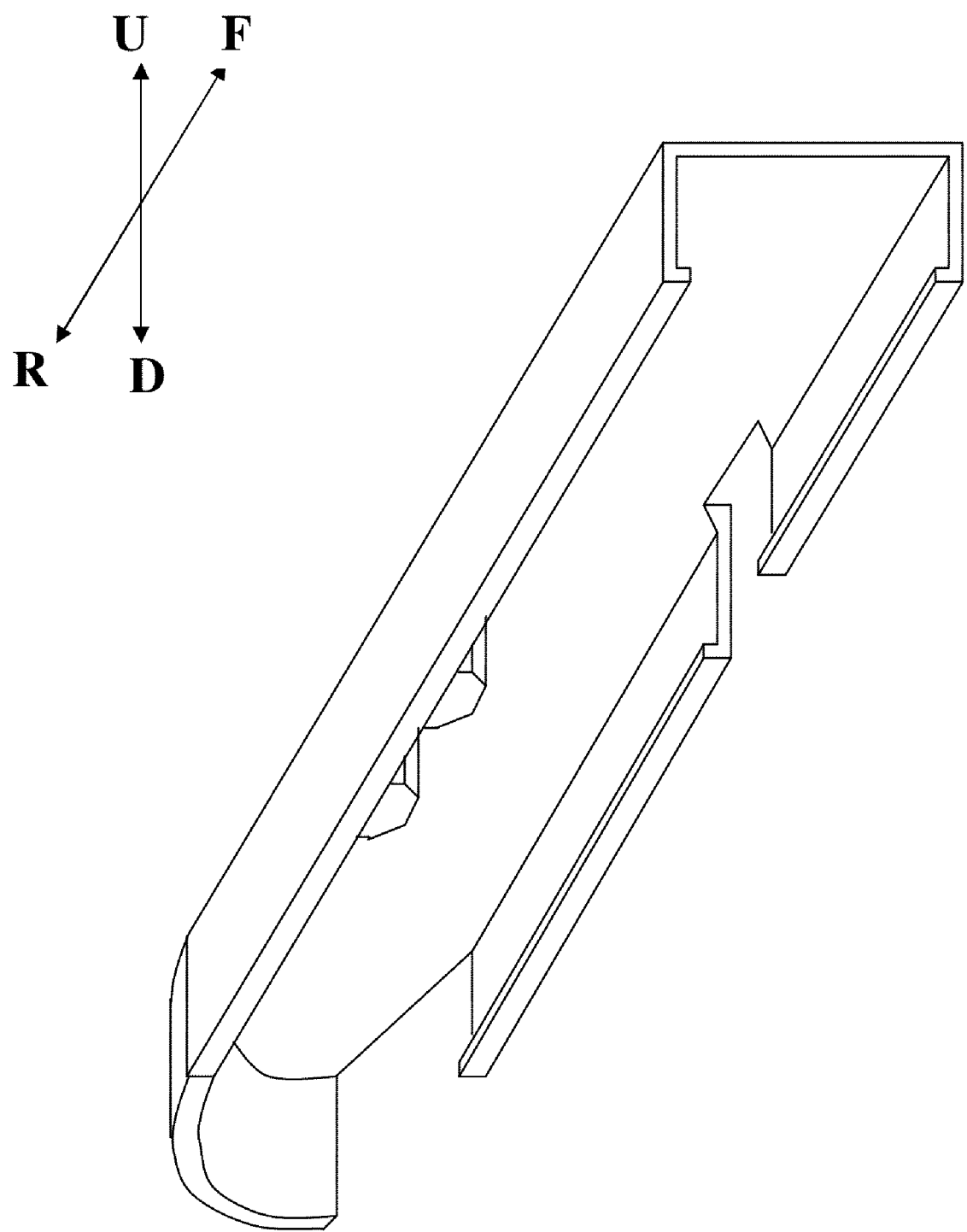
FIGS. 10 and 11 are perspective schematic views illustrating the relative position of the first part and second parts of a track of a slide-out tray system according to another embodiment of the present invention.
Figure 11:
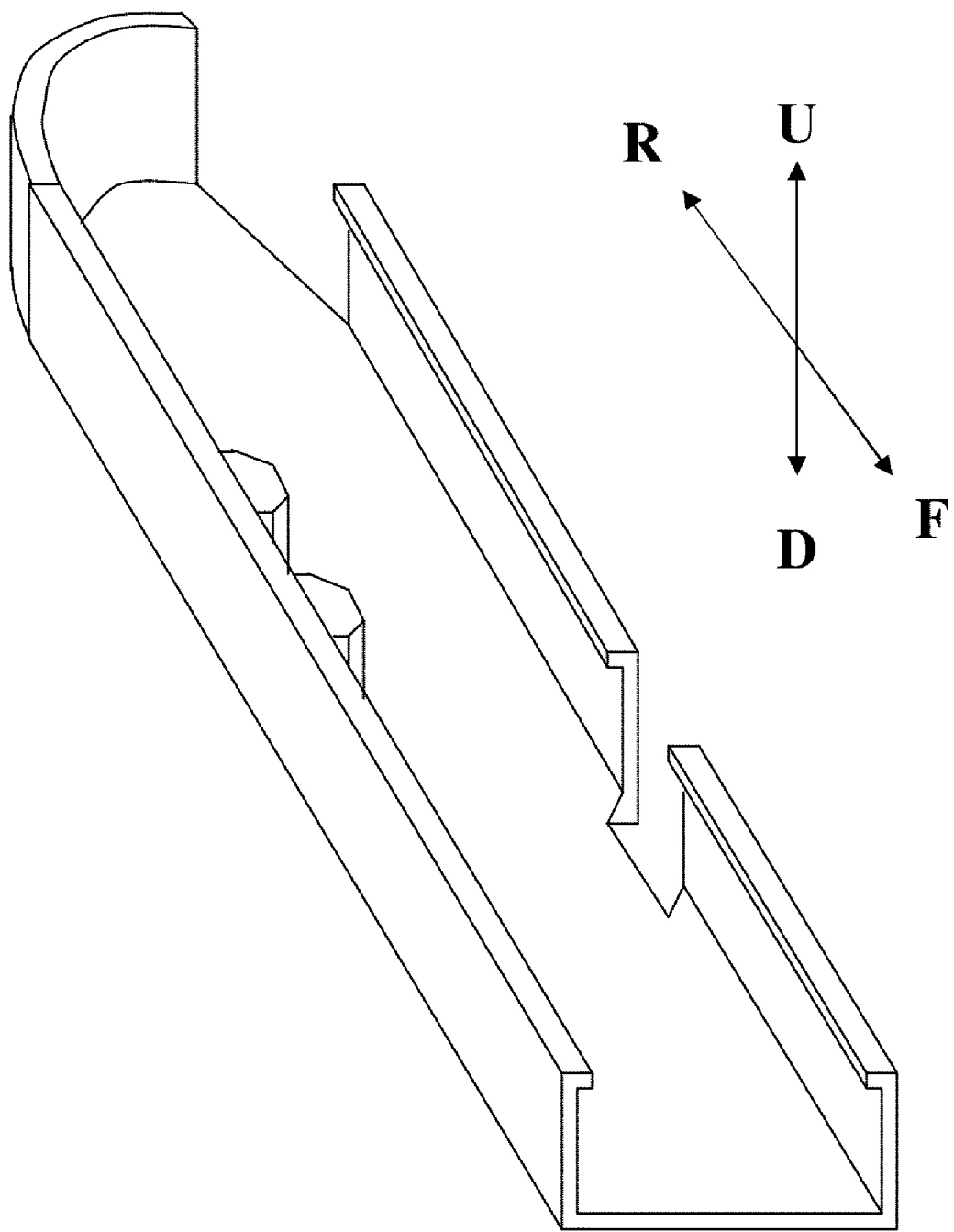
Figure 12:
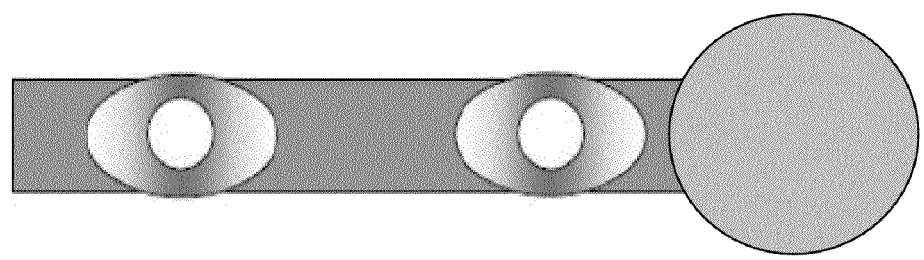
FIGS. 12A and 12B are a top view and a side view, respectively, of a bearing and a bearing bracket of a slide-out tray system of FIGS. 10 and 11.
Figure 12:
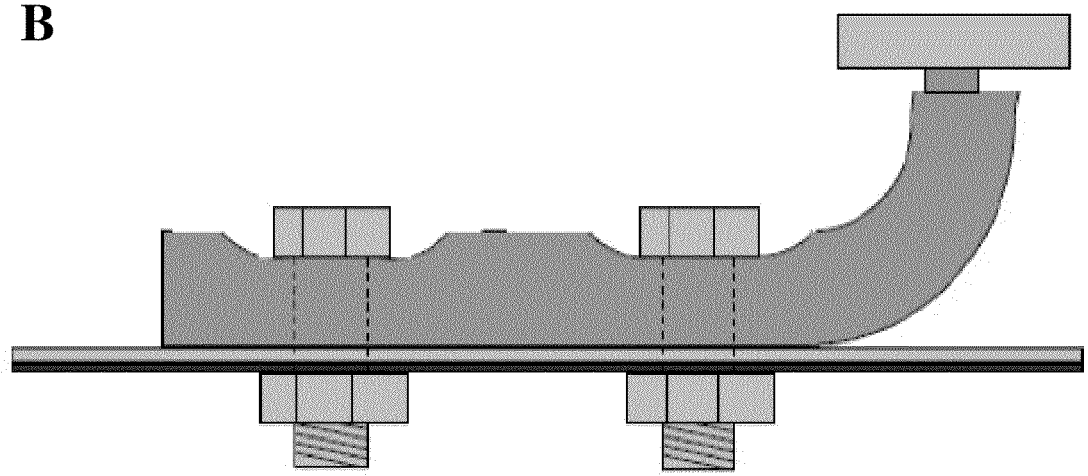

In another embodiment of the present invention, the first part (11) may be positioned in parallel with the second part (12). For example, the first part (11) of the track (10) can be positioned on the left or right side of the bearings and the second rail of the second part (12) of the track (10) can be positioned on the right or left side of the bearings (50), as shown FIGS. 10 and 11. The tray (20) may be mounted on top of the first part, the second part, or both, and the vehicle underbody panel (100) near a space (101) provided for installing a spare tire (102) is connected to the bottom of the first part, the second part, or both. In this embodiment, each of the bearings (50) may be fitted into a bracket such that the bearings are positioned in a horizontal direction, as shown in FIGS. 12A and 12B.

The track can be removed out of the trunk by a process similar to the process described above with reference to FIGS. 5A to 5E except the track is divorced from the bearings in a horizontal direction. The other configuration and features of this embodiment are similar to those of the above-described embodiment, and detailed descriptions thereof are thus omitted.

With the slide-out tray systems for a vehicle according to the present invention, loading and uploading of items to and from the trunk can be made in a each and convenient way.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A slide-out tray system for a vehicle which includes a trunk lid, a latch attached to a rear portion of the trunk lid, and a connector part connecting the trunk lid to a portion of a body panel of the vehicle so as to be able to open and close the trunk lid, the system comprising:
   a pair of tracks mounted, in a vehicle length direction, to a vehicle underbody panel near a space provided for installing a spare tire;
   a tray mounted on the tracks;
   a bar pivotally connected to the connector part so that the bar can move in one direction when the trunk lid becomes closed and can move in another direction when the trunk lid becomes opened; and
   a cable connected to the tray and the bar and having a length such that when the trunk lid is open, the tray can be pulled out of the trunk in a rearward direction without interference by tension applied to the cable,
   wherein each of the tracks comprises a first part and a second part positioned below the first part and connected to the first part so as to move together, the tray is mounted on top of the first part, and the second part is mounted on the vehicle underbody panel near a space provided for installing a spare tire, and
   at least one protrusion is attached to the first part at one or more predetermined positions, a stopper is attached to the front end portion of the first part, and the second part includes therein one or more openings whereby when the bearings are divorced from the first and second parts through the opening or openings, the tray can be removed from the trunk.

2. The system of claim 1, wherein the first part and the second part are formed integrally.

3. The system of claim 1, wherein the second part is mounted to the vehicle underbody panel near a space provided for installing a spare tire by a plurality of brackets each of which supports a plurality of bearings, and the bearings supported in the brackets are positioned between the first part and the second part such that the first and second parts are slidable by rotation of the bearing or bearings.

4. The system of claim 1, wherein the tray is detachably mounted on top of the first part.

5. The system of claim 1, wherein one or more of the brackets are detachably connected to the vehicle underbody panel.

6. The system of claim 3, wherein a trunk trim board is interposed between the brackets and the vehicle underbody panel.

7. The system of claim 3, wherein one of the protrusion, the stopper, or both are integrally formed with the first part.

8. The system of claim 1, wherein the tray has heightened edges so as to prevent items on the tray from escaping from the tray.

9. The system of claim 1, wherein the bar pivotally moves such that the tray can be pushed in a forward direction by tension applied to the cable caused when the trunk lid becomes closed.

10. The system of claim 1, wherein each of the tracks includes a first part and a second part positioned in parallel with the first part and connected to the first part so as to move together, the tray is mounted on top of the first part, the second part, or both and the vehicle underbody panel near a space provided for installing a spare tire is connected to one of the first part, the second part, or both.

11. The system of claim 10, wherein the first part and the second part are formed integrally.

12. The system of claim 10, wherein the second part is mounted to the vehicle underbody panel near a space provided for installing a spare tire by a plurality of brackets each of which supports a plurality of bearings, and the bearings supported in the brackets are positioned between the first part and the second part such that the first and second parts are slidable by rotation of the bearing or bearings.

13. The system of claim 10, wherein the tray is detachably mounted on top of the first part.

14. The system of claim 10, wherein one or more of the brackets are detachably connected to the vehicle underbody panel.

15. The system of claim 12, wherein a trunk trim board is interposed between the brackets and the vehicle underbody panel.

16. The system of claim 12, wherein the protrusion, the stopper, or both are integrally formed with the first part.

* * * * *